(12) United States Patent
Amador et al.

(10) Patent No.: US 11,028,717 B2
(45) Date of Patent: Jun. 8, 2021

(54) BEARING ASSEMBLY FOR GAS TURBINE ENGINES

(71) Applicant: United Technologies Corporation, Farmington, CT (US)

(72) Inventors: Armando Amador, Wethersfield, CT (US); Nasr A. Shuaib, Watertown, MA (US); Martin J. Walsh, Farmington, CT (US); William G. Sheridan, Southington, CT (US); Eric A. Grover, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 676 days.

(21) Appl. No.: 15/632,628

(22) Filed: Jun. 26, 2017

(65) Prior Publication Data
US 2018/0371929 A1   Dec. 27, 2018

(51) Int. Cl.
*F01D 11/04* (2006.01)
*F01D 25/18* (2006.01)
(Continued)

(52) U.S. Cl.
CPC ............ *F01D 11/04* (2013.01); *F01D 25/162* (2013.01); *F01D 25/183* (2013.01); *F16C 33/6685* (2013.01); *F16C 33/76* (2013.01); *F01D 5/02* (2013.01); *F02K 3/06* (2013.01); *F04D 25/04* (2013.01); *F05D 2220/32* (2013.01); *F05D 2240/56* (2013.01); *F05D 2240/60* (2013.01);
(Continued)

(58) Field of Classification Search
CPC ...... F01D 11/04; F01D 25/162; F01D 25/183; F01D 5/02; F02K 3/06; F04D 25/04; F05D 2220/32; F05D 2240/56; F05D 2240/60; F05D 2240/70; F05D 2260/98; F16C 2360/23; F16C 33/6685; F16C 33/76
See application file for complete search history.

(56) References Cited

U.S. PATENT DOCUMENTS 5,749,584 A * 5/1998 Skinner .................. F01D 9/023
                                                    277/355
6,858,056 B2   2/2005 Kwan
(Continued)

FOREIGN PATENT DOCUMENTS

EP   1045178   10/2000
EP   1724445   11/2006
(Continued)

OTHER PUBLICATIONS

European Search Report for European Patent Application No. 18179970 completed Oct. 11, 2018.

*Primary Examiner* — Phutthiwat Wongwian
*Assistant Examiner* — Diem T Tran
(74) *Attorney, Agent, or Firm* — Carlson, Gaskey & Olds, P.C.

(57) ABSTRACT

A bearing assembly according to an example of the present disclosure includes, among other things, a bearing situated in a bearing compartment, a seal assembly that defines the bearing compartment, at least one deflector between the bearing and the seal assembly that is rotatable about an axis, and a coalescer at least partially extending about the at least one deflector to define a fluid passage. A method of sealing is also disclosed.

21 Claims, 13 Drawing Sheets

(51) Int. Cl.
     *F16C 33/66*     (2006.01)
     *F01D 25/16*     (2006.01)
     *F16C 33/76*     (2006.01)
     *F01D 5/02*     (2006.01)
     *F02K 3/06*     (2006.01)
     *F04D 25/04*     (2006.01)

(52) U.S. Cl.
     CPC ...... *F05D 2240/70* (2013.01); *F05D 2260/98* (2013.01); *F16C 2360/23* (2013.01)

(56) References Cited

U.S. PATENT DOCUMENTS

| | | | |
|---|---|---|---|
| 8,092,093 B2 * | 1/2012 | Fang | F01D 25/183 |
| | | | 277/423 |
| 9,115,592 B2 | 8/2015 | Gauthier et al. | |
| 9,382,844 B2 | 7/2016 | Muldoon et al. | |
| 2009/0133581 A1 | 5/2009 | Fang et al. | |
| 2014/0119887 A1 | 5/2014 | Lyle et al. | |
| 2014/0300058 A1 | 10/2014 | Brunet et al. | |
| 2015/0369074 A1 | 12/2015 | Faulder | |
| 2016/0305283 A1 | 10/2016 | Morreale et al. | |
| 2016/0326959 A1 | 11/2016 | Burnside et al. | |

FOREIGN PATENT DOCUMENTS

| | | |
|---|---|---|
| EP | 2157289 | 2/2010 |
| KR | 20130055921 | 5/2013 |

* cited by examiner

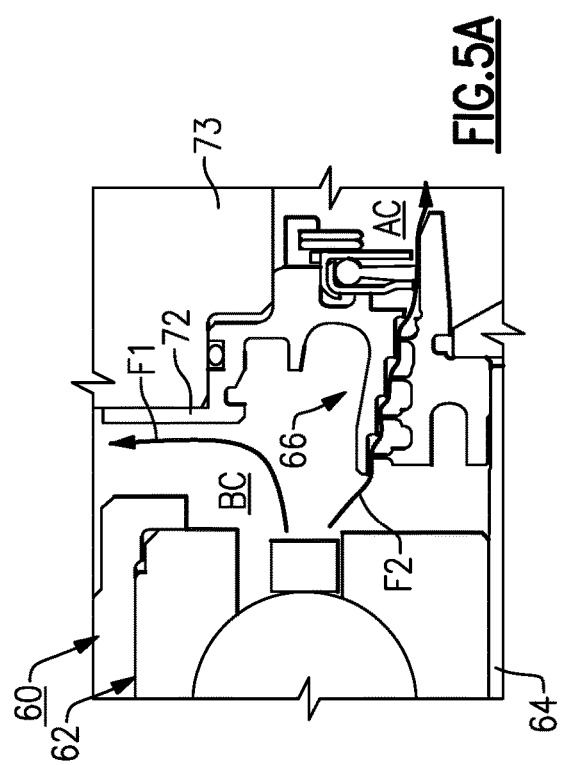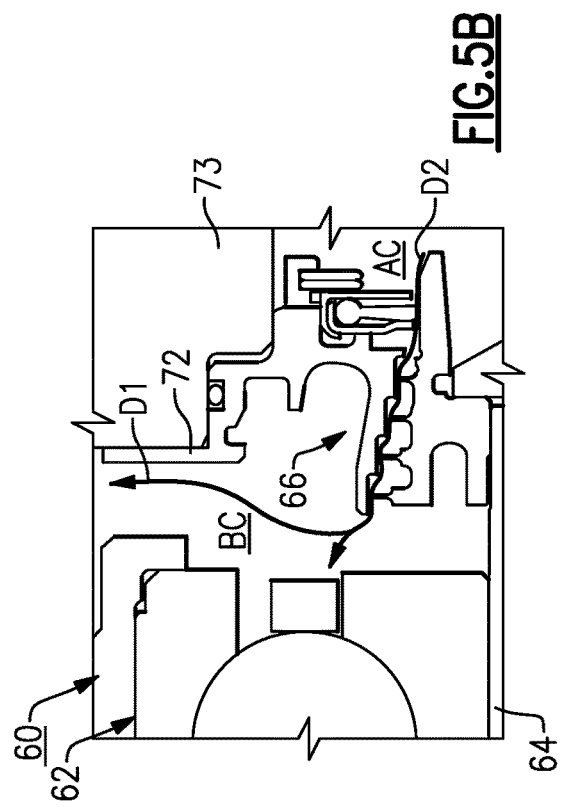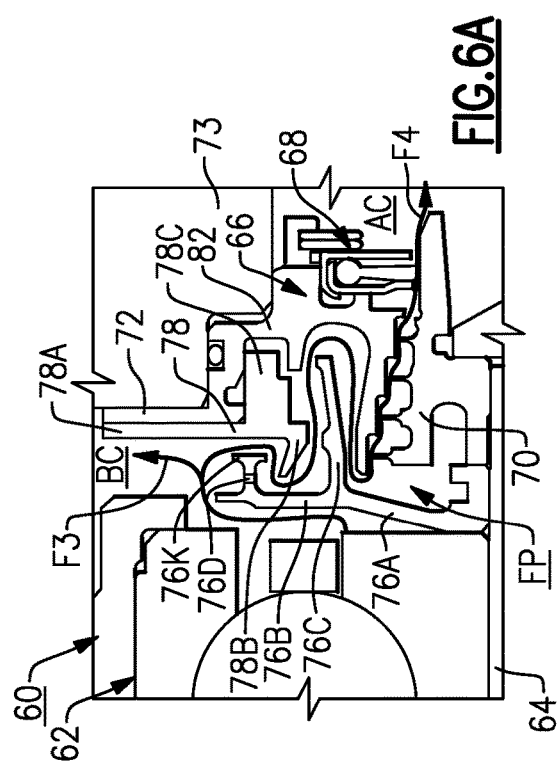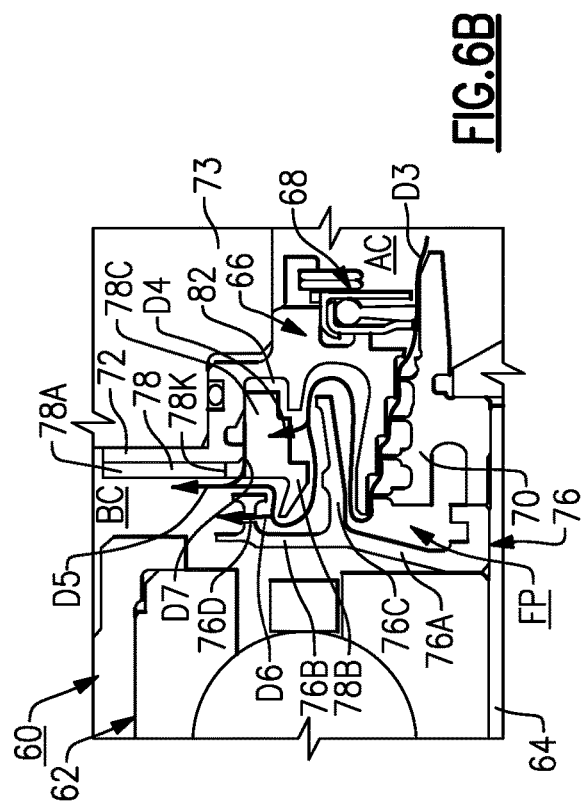

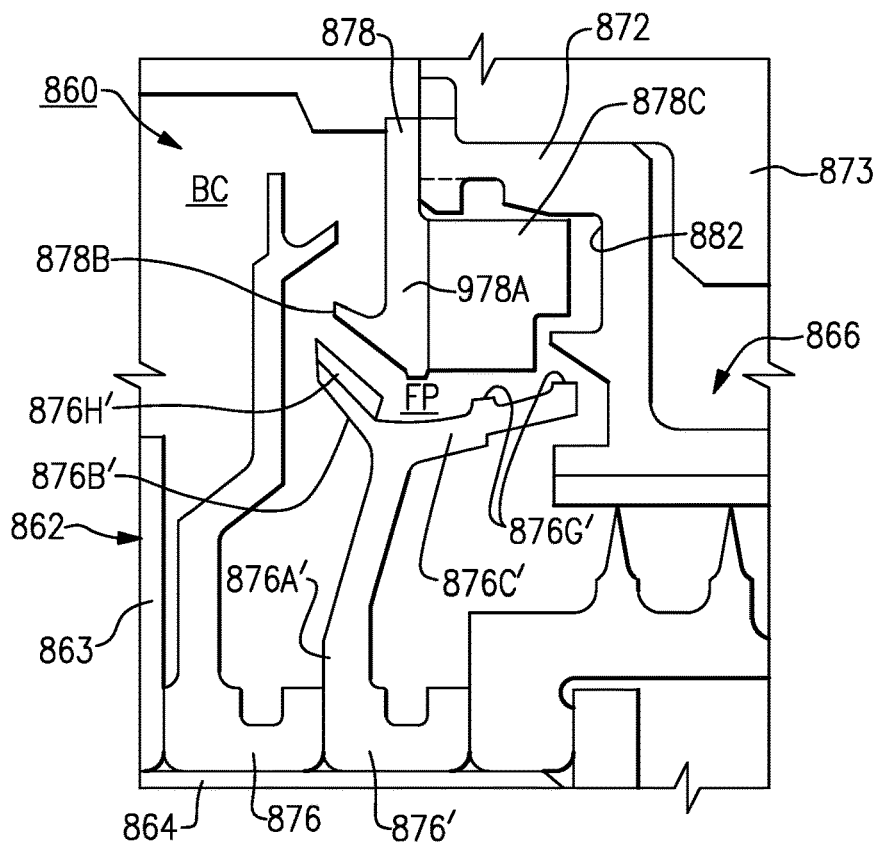
FIG.15
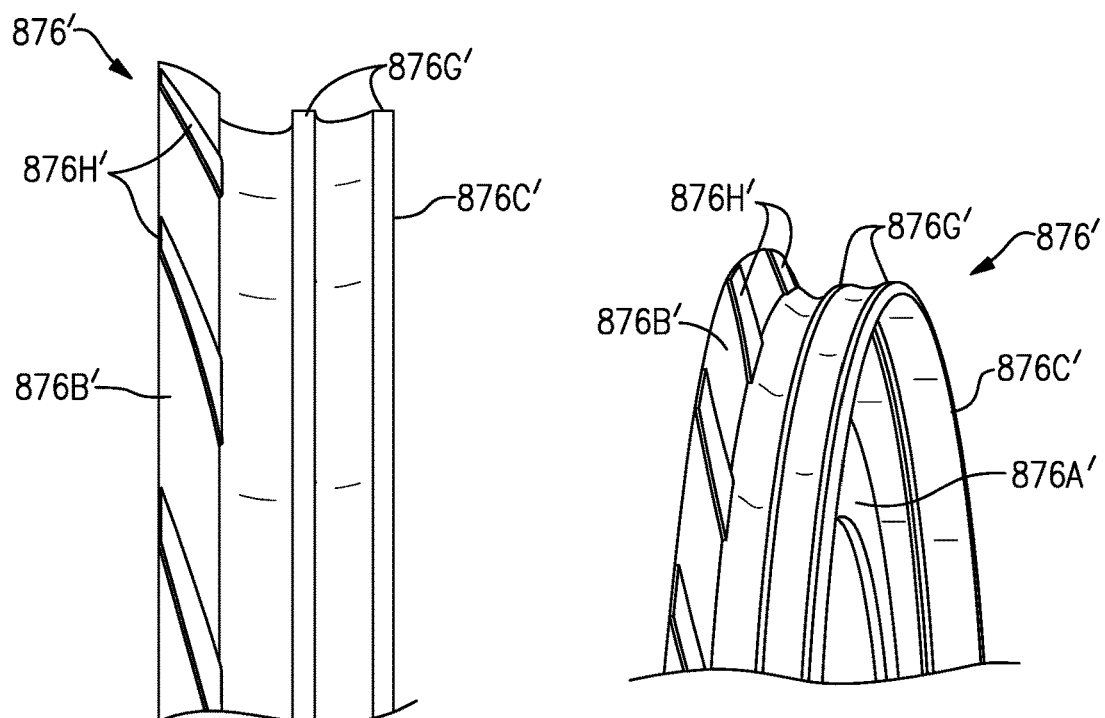
FIG.16
FIG.17

BEARING ASSEMBLY FOR GAS TURBINE ENGINES

BACKGROUND

This application relates to sealing for a gas turbine engine, including bearing arrangements that establish flow paths for migration of lubricant and debris in bearing compartments.

Gas turbine engines are known, and typically include a fan delivering air into a low pressure compressor section. The air is compressed in the low pressure compressor section, and passed into a high pressure compressor section. From the high pressure compressor section the air is introduced into a combustor section where it is mixed with fuel and ignited. Products of this combustion pass downstream over a high pressure turbine section, and then a low pressure turbine section to extract energy for driving the fan.

Bearing compartments typically receive fluid for cooling and lubricating one or more bearings. The bearing compartment may include one or more seals that fluidly separate the bearing compartment from an adjacent cooling air cavity.

SUMMARY

A bearing assembly according to an example of the present disclosure includes a bearing situated in a bearing compartment, a seal assembly that defines the bearing compartment, at least one deflector between the bearing and the seal assembly that is rotatable about an axis, and a coalescer at least partially extending about the at least one deflector to define a fluid passage.

In a further embodiment of any of the foregoing embodiments, the at least one deflector is rotatable with a shaft to cause fluid in the fluid passage to impinge on the coalescer.

In a further embodiment of any of the foregoing embodiments, the at least one deflector includes a ring-shaped deflector body and one or more paddles extending from the deflector body.

In a further embodiment of any of the foregoing embodiments, the at least one deflector includes a ring-shaped deflector body, a circumferential rib and one or more pockets each defined about a circumference of the deflector body, and an outer periphery of the circumferential rib sloping towards the one or more pockets.

In a further embodiment of any of the foregoing embodiments, the coalescer includes a ring-shaped coalescer body and one or more paddles extending from the coalescer body.

In a further embodiment of any of the foregoing embodiments, the coalescer includes a first circumferential flange and a second circumferential flange that extend from opposed sidewalls of the coalescer body. The one or more paddles are distributed about an outer periphery of the second circumferential flange.

In a further embodiment of any of the foregoing embodiments, the at least one deflector and the coalescer are arranged such that the fluid passage is a serpentine fluid passage connected to the seal assembly.

In a further embodiment of any of the foregoing embodiments, the at least one deflector includes a first deflector and a second deflector. The first deflector extends between the bearing and the coalescer, and the second deflector extends between an inner periphery of the coalescer and portions of the seal arrangement.

In a further embodiment of any of the foregoing embodiments, the second deflector is configured to establish a sealing relationship with the inner periphery of the coalescer in response to relative rotation.

In a further embodiment of any of the foregoing embodiments, the seal assembly has a labyrinth seal and a brush seal that oppose flow of lubricant from the bearing compartment. The coalescer has a ring-shaped coalescer body that circumferentially extends about the deflector and is attached to a static structure, one or more coalescer paddles that extend from a first radially face of the coalescer body, and a circumferential flange that extends from a second, opposed radially face of the coalescer body. The at least one deflector includes a ring-shaped deflector body that extends about a circumference of a shaft, and has a first flange and a second flange each branching from the deflector body. The first flange extends radially between the bearing and the coalescer with respect to the axis.

In a further embodiment of any of the foregoing embodiments, the at least one deflector abuts against a carrier of the bearing. The coalescer body has an arcuate top portion that extends at least 180 degrees about a coalescer axis. The top portion is free of any coalescer paddles. The second flange of the at least one deflector is coaxial with portions of the labyrinth seal and an inner periphery of the coalescer body to define an intermediate section of the fluid passage. The fluid passage includes a first section that extends through the labyrinth seal. A second section extends between the first flange of the at least one deflector and the circumferential flange of the coalescer, and an intermediate section connects the first and second sections such that the fluid passage is a serpentine fluid passage.

A gas turbine engine according to an example of the present disclosure includes a fan section that has a plurality of fan blades, a compressor section in fluid communication with the fan section, a turbine section driving the fan section or the compressor section through a rotatable shaft, and a bearing assembly supporting the shaft. A bearing is situated in a bearing compartment. A seal assembly extends from a seal support. The seal support defines a trough extending from a floor, with an opening of the trough situated between the floor and the shaft. A deflector rotates with the shaft and extends toward the trough.

In a further embodiment of any of the foregoing embodiments, the trough is bounded by a coalescer that extends about the deflector.

A further embodiment of any of the foregoing embodiments includes a coalescer that has one or more coalescer paddles circumferentially distributed about a ring-shaped coalescer body. Each of the one or more paddles extends into the trough. The deflector has a deflector body and one or more circumferentially distributed deflector paddles.

In a further embodiment of any of the foregoing embodiments, the deflector carries a coalescer, and defines one or more deflector pockets adjacent to the coalescer.

In a further embodiment of any of the foregoing embodiments, the seal assembly includes a labyrinth seal and a brush seal that establish a sealing relationship at a location radially inward of the trough.

A method of sealing for a gas turbine engine according to an example of the present disclosure includes communicating fluid within a bearing compartment through a fluid passage defined between a deflector and a coalescer, and establishing a first sealing relationship along the fluid passage.

A further embodiment of any of the foregoing embodiments includes coalescing the fluid at the coalescer, and communicating coalesced fluid from the coalescer to a gutter system radially outward of the fluid passage.

A further embodiment of any of the foregoing embodiments includes rotating the deflector to cause fluid to impinge on the coalescer.

A further embodiment of any of the foregoing embodiments includes rotating the deflector to establish a second sealing relationship along the flow path between the deflector and the coalescer.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 5A illustrates lubricant flow paths established by the bearing assembly of FIG. 2 with a deflector and a coalescer omitted.

FIG. 5B illustrates debris flow paths established by the bearing assembly of FIG. 2 with a deflector and a coalescer omitted.

FIG. 6A illustrates lubricant flow paths established by the bearing assembly of FIG. 2.

FIG. 6B illustrates debris flow paths established by the bearing assembly of FIG. 2.

FIG. 15 illustrates a bearing assembly according to a ninth example.

FIG. 16 illustrates a side view of a deflector according to a second example.

FIG. 17 illustrates a perspective view of the deflector of FIG. 16.

Like reference numbers and designations in the various drawings indicate like elements.

DETAILED DESCRIPTION

Figure 1:
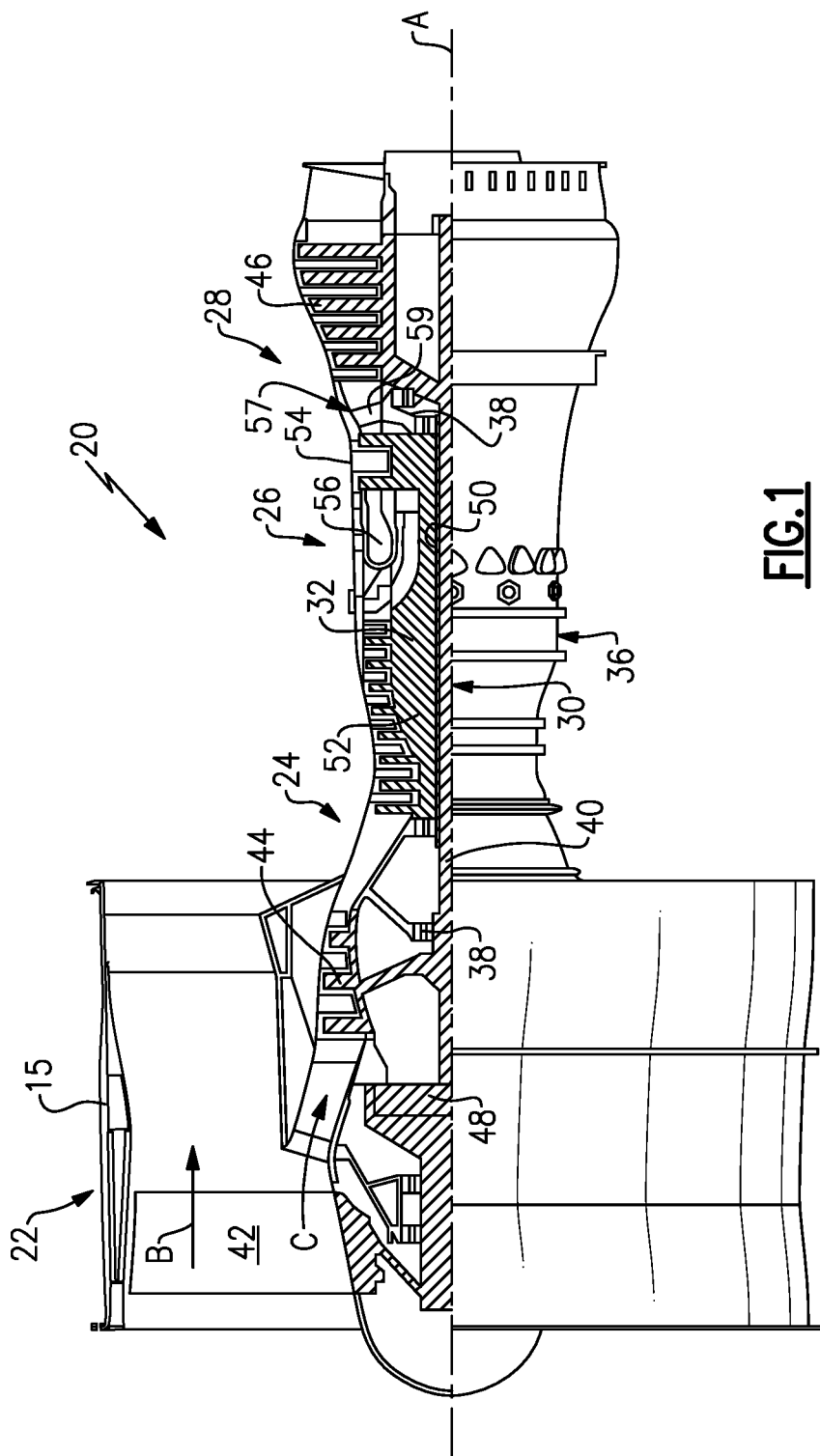
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the embodiments of the present invention are applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
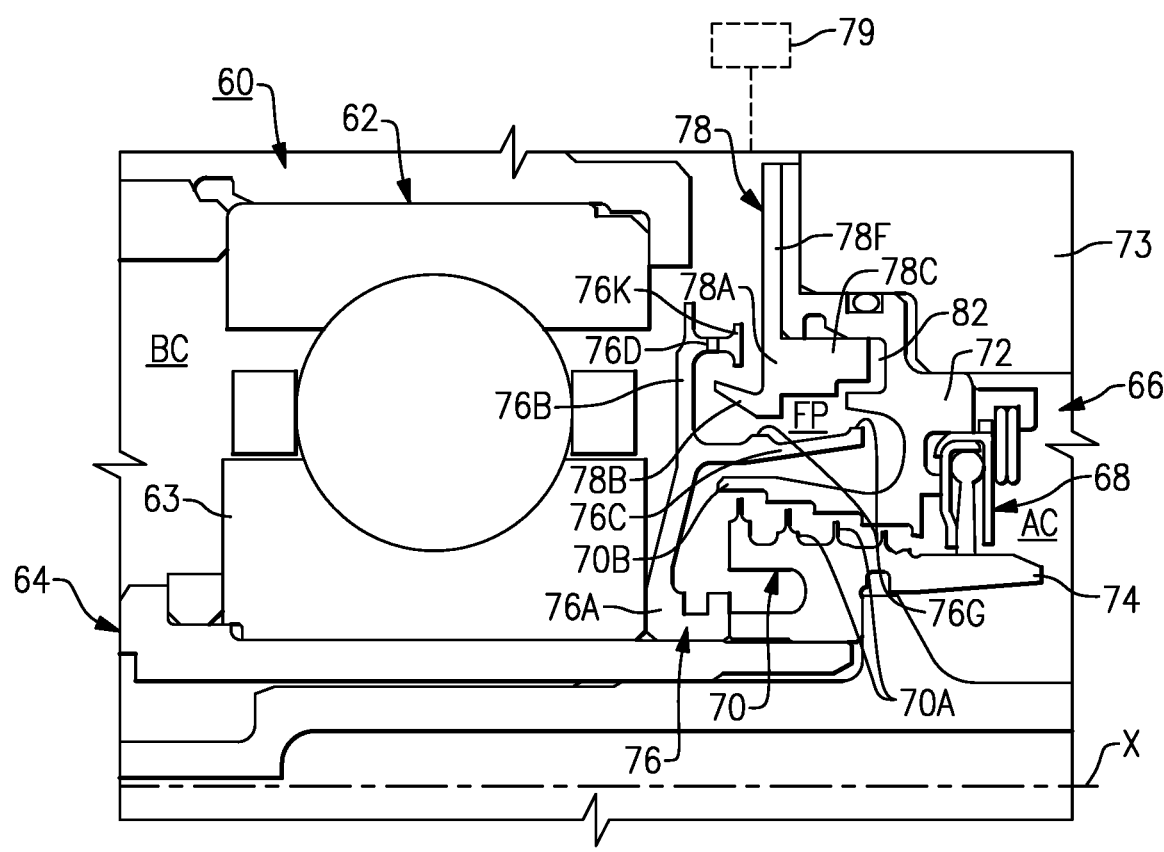
FIG. 2 illustrates a bearing assembly according to a first example.

FIG. 2 illustrates a bearing assembly 60 according to an example. The bearing assembly 60 can be incorporated into the gas turbine engine 20, such as one of the bearing systems 38, for example. The bearing assemblies disclosed herein can reduce a likelihood of lubricant flowing into air cavities adjacent to the bearing assembly and also from reducing a likelihood of debris entering into the bearing assembly and interacting with one or more of the bearings situated therein. Other components of the engine 20 and other systems may benefit from the teachings herein, such as a towershaft coupled to one of the shafts 40, 50 for driving an auxiliary power unit, fluid paths established between rotating and static components, and bearing arrangements within industrial land based turbines.

The bearing assembly 60 includes one or more bearings 62 (one shown for illustrative purposes) situated in a bearing compartment BC. The bearing 62 can include one or more components such as a bearing carrier 63 including rotatable and static portions for supporting rotatable components of the bearing 62. In the illustrated example, the bearing 62 is a ball bearing. Other example bearings can include roller bearings and taper bearings. The bearing 62 supports a shaft 64 that is situated along a longitudinal axis X. The shaft 64 can be inner shaft 40 or outer shaft 50 of the spools 30, 32 (FIG. 1), for example. The shaft 64 can include one or more portions mechanically attached to each other for rotation about the longitudinal axis X. The longitudinal axis X can be co-axial with the engine central longitudinal axis A (FIG. 1).

The bearing assembly 60 includes a seal assembly 66 bounding or otherwise defining a perimeter of the bearing compartment BC. The seal assembly 66 can be configured to fluidly separate the bearing compartment BC from an adjacent airflow cavity or compartment AC that can be supplied with pressured cooling airflow for cooling various components of the engine 20. The seal assembly 66 contains or otherwise opposes migration of lubricant from the bearing compartment BC to the airflow compartment AC, thereby reducing a likelihood of degradation of components of the engine 20 or auto-ignition of the lubricant in relative high temperature locations such the compressor section 24 or the turbine section 28 (FIG. 1). For the purposes of this disclosure, the term fluid includes particles capable of flowing such as lubricant or air in various states including gas, mist, vapor or liquid form.

The seal assembly 66 can include a brush seal 68 and a labyrinth seal 70 that each include portions attached to, and extending from, a seal carrier or support 72. The seal support 72 can be attached to a static structure, such as case 73 or a portion of engine static structure 36 (FIG. 1). The labyrinth seal 70 includes one or more circumferentially swept knife edges or protrusions 70A situated adjacent to a seal land 70B for establishing a sealing relationship. In the illustrated example, the seal land 70B is attached to, or is otherwise provided by, the seal support 72. The brush seal 68 is situated adjacent to seal land 74 that extends axially from the labyrinth seal 70 to establish a sealing relationship that is sequential with the sealing relationship established by the labyrinth seal 70. Other seals can be utilized with the teachings herein, such as carbon seals and finger seals. Although labyrinth seals and brush seals may generate relatively greater debris than carbon seals, for example, labyrinth seals and brush seals can be operated at relatively higher rotational speeds.

The bearing assembly 60 includes at least one deflector 76 for shielding or otherwise fluidly separating the seal assembly 66 and the bearing 62. The deflector 76 is situated axially between the bearing 62 and the seal assembly 66, and is rotatable about the longitudinal axis X with the shaft 64. The deflector 76 can include a generally annular or ring-shaped deflector body 76A that extends about, and is attached to, a circumference of the shaft 64. The deflector body 76A can directly abut against the bearing carrier 63 and/or the seal assembly 66.

The deflector 76 can include a first flange 76B and a second flange 76C each branching from the deflector body 76A. The first flange 76B extends in a generally radial direction, and the second flange 76C extends in a generally axial direction with respect to the longitudinal axis X. The flanges 76B, 76C can include one or more features for metering flow through the flow path FP. For example, flange 76C can define one or more raised protrusion or circumferential ridges 76G defined about an outer periphery of the flange 76C.

The bearing assembly 60 includes at least one coalescer 78 that serves to cause lubricant in the form of mist, vapor or aerosol in the bearing compartment BC to coalesce or amalgamate into relatively larger droplets prior to scavenging the coalesced fluid or lubricant. The coalescer 78 can reduce windage in adjacent flow paths and create a relatively quiet region for lubricant to be collected and scavenged. Scavenging can occur along a sump or gutter system 79 (depicted schematically in dashed lines) radially outward of the fluid passage FP at a bottom dead center of the bearing compartment BC or engine 20, for example. The coalescer 78 can be made of a solid material such as low carbon steel, or can be made of a porous material that serves as a sponge for collecting lubricant particles circulating in the bearing compartment BC.

The coalescer 78 can be arranged relative to the deflector 76 to establish a generally circuitous fluid passage FP between the seal assembly 66 and other portions of the bearing compartment BC. In the illustrated example, the first flange 76B of deflector 76 extends radially between portions of the bearing 62 and the coalescer 78, and the second flange 76C of the deflector 76 extends axially between portions of the coalescer 78 and the seal assembly 66 with respect to longitudinal axis X. The deflector 76 can be rotatable with shaft 64 to cause fluid in fluid passage FP to impinge on surfaces of the coalescer 78.

Figure 3:
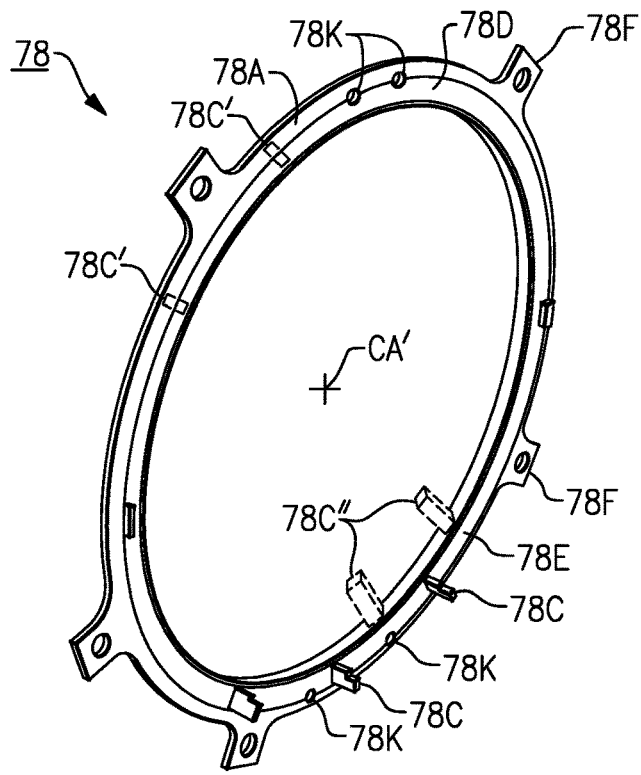
FIG. 3 illustrates a perspective view of a coalescer according to a first example.

The coalescer 78 can include a generally annular or ring-shaped coalescer body 78A that extends about a coalescer axis CA (FIG. 3). The coalescer body 78A is arranged to at least partially extend about the deflector 76 to bound or otherwise define portions of the fluid passage FP. The coalescer body 78A can be mechanically attached to a static structure such as the seal support 72 via one or more mounting flanges 78F. Various means for attaching can be utilized such as one or more fasteners or welding.

The coalescer 78 can include a circumferential flange 78B extending from a radial face of the coalescer body 78A. The circumferential flange 78B can be situated radially between portions of the first and second flanges 76B, 76C of the deflector 76 and can serve as a drip edge. The extension 76K of flange 76B has an annular geometry that is swept about the longitudinal axis X to substantially surround circumferential flange 78B to impede flow through the fluid passage FP. The extension 76K can define one or more fluid passages 76D (one shown) extending through a thickness of the extension 76K for migration of fluid in the fluid passage FP.

The coalescer 78 can include one or more coalescer paddles 78C for reducing windage in adjacent flow paths. Each of the coalescer paddles 78C can be arranged to extend into a pocket 82 defined between the coalescer body 78A and the seal support 72. In the illustrated example, the pocket 82 is an annular groove or trough that is swept about the longitudinal axis X and has an opening that faces radially inward toward the shaft 64 and longitudinal axis X. The labyrinth seal 70 and brush seal 68 can define a sealing relationship at a location radially inward of the pocket 82. The pocket 82 can assist in migration of lubricant away from a radial flow field adjacent the shaft 64 and other associated rotatable components, which can improve the collection and scavenging of lubricant.

Referring to FIG. 3 with continued reference to FIG. 2, the coalescer body 78A includes an arcuate top portion 78D extending at least about 180 about the coalescer axis CA and joining with an arcuate bottom portion 78E. In the illustrated example, one or more of the coalescer paddles 78C are arranged along the bottom portion 78E, such as along an arc extending between about 15-45 degrees relative to the coalescer axis CA, and the top portion 78D is free of any coalescer paddles for reducing a likelihood of lubricant dripping down onto the seal assembly 66. In other examples, the top portion 78D includes one or more coalescer paddles 78C' (shown in dashed lines). The coalescer paddles 78C can extend from a radially extending face or sidewall of the coalescer body 78A that is opposed to a sidewall of the coalescer body 78A from which the circumferential flange 78B extends. In other examples, one or more coalescer paddles 78C" (shown in dashed lines) extend from a circumferential face of the coalescer body 78A, such as radially inward from an inner diameter of the coalescer body 78A.

The coalescer body 78A can define one or more passages 78K (see also FIG. 6B) for venting fluid between the pocket 82 and other portions of the bearing compartment BC and/or reducing a likelihood of over-pressurization in the fluid passage FP.

Figure 4:
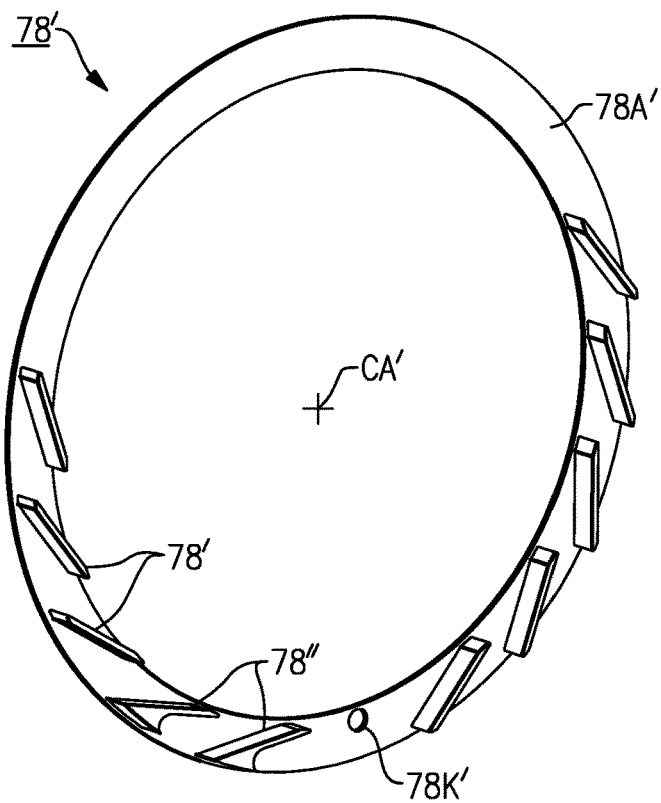
FIG. 4 illustrates a perspective view of a coalescer according to a second example.

Referring to FIG. 4, a coalescer 78' accordingly to another example is shown illustrating various geometries of coalescer paddles. For example, the coalescer 78' can have one or more generally elongated coalescer paddles 78C' that can have a skewed orientation relative to the inner and/or outer diameters of coalescer body 78A'. The coalescer 78' can include one or more coalescer paddles 78C" having a scoop or generally hooked shaped protrusion to encourage scavenging of lubricant in the flow path FP (FIG. 2).

FIGS. 5A-5B and 6A-6B illustrate various lubricant and debris flow paths established by components of the bearing assembly 60. FIGS. 5A and 5B illustrate the bearing assembly 60 with deflector 76 and coalescer 78 omitted for illustrative purposes. Referring to FIG. 5A, the bearing assembly 60 establishes a first fluid path F1 and a second fluid path F2. The first fluid path F1 flows radially outward, such as toward bottom dead center of the bearing compartment BC. The second fluid path F2 is defined through the seal assembly 66 between the bearing compartment BC and the airflow compartment AC. Referring to FIG. 5B, bearing assembly 60 establishes a first debris path D1 branching from a second debris path D2. The first debris path D1 extends radially outward. The second debris path D2 is defined through the seal assembly 66 between the airflow chamber AC towards the bearing compartment BC.

FIGS. 6A and 6B illustrate the bearing assembly 60 with the deflector 76 and the coalescer 78 in the installed position. Referring to FIG. 6A, the first flange 76B of the deflector 76 establishes a third fluid path F3 that extends radially outward, such as toward bottom dead center of the bearing compartment BC, to at least partially shield or otherwise fluidly separate the bearing 62 from the seal assembly 66. The various geometries of the deflectors disclosed herein oppose the traversal of lubricant or debris through the bearing compartment BC.

The deflector 76 and the coalescer 78 cooperate to define a fourth fluid path F4 extending through the fluid passage FP and that branches from the third fluid path F3. The deflector 76 and the coalescer 78 are arranged such that the fluid passage FP has a generally serpentine geometry connected to the seal assembly 66 to oppose flow of lubricant through the fourth fluid path F4. The first flange 76B and the circumferential flange 78B cooperate to establish a first section of the fourth fluid path F4. The second flange 76C of the deflector 76 is coaxial with portions of the coalescer body 78A to establish a first intermediate section of the fourth fluid path F4.

The second flange 76C of the deflector 76 is coaxial with portions of the labyrinth seal 70 or seal support 72 to define a second intermediate section of the fourth fluid path F4. The labyrinth seal 70 and brush seal 68 define a second portion of the fourth fluid path F4 that is in fluid communication with the airflow compartment AC. The intermediate sections of the fourth fluid path F4 connect the first and second sections adjacent to the bearing compartment BC and the airflow compartment AC.

Referring to FIG. 6B, the seal assembly 66 defines a third debris path D3 in communication with the airflow compartment AC, that follows the fluid passage FP between portions of the labyrinth seal 70 or seal support 72 and the second flange 76C of the deflector 76. The second flange 76C routes flow toward a fourth debris path D4 between the coalescer paddles 78C, and a fifth debris path D5 that extends between the coalescer body 78A and second flange 76C, between the circumferential flange 78B and the first flange 76B, and outward to other portions of the bearing compartment BC. Passage 76D of the deflector 76 can define a sixth debris path D6 for impeding flow of debris through the fluid passage FP, and passage 78K (shown in dashed lines) of the coalescer 78 can define a seventh debris path D7 for assisting in migration of flow of debris from pocket 82 toward the fifth debris path D5.

As illustrated by FIG. 6A, the fluid passage FP is defined such that lubricant communicated along the third and fourth fluid paths F3, F4 has a relatively longer and more complex, circuitous route as compared to the first and second fluid paths F1, F2 of FIG. 5A. This arrangement redirects the flow of lubricant or otherwise reduces a likelihood that lubricant will migrate from the bearing compartment BC into the airflow compartment AC. The arrangement of the fluid passage FP also reduces a likelihood that airflow or lubricant in the form of mist, vapor or aerosol in the bearing compartment BC recirculates in a local region of the bearing compartment BC adjacent to the seal assembly 66 prior to being scavenged. The arrangement of the fluid passage FP also increases the collection of lubricant in the form of mist, vapor or aerosol in the pocket 82 for amalgamation by coalescer 78.

As illustrated by FIG. 6B, the fluid passage FP is defined such that debris that is communicated along the third through seventh debris paths D3-D7 has a relatively longer and more complex, circuitous route as compared to the first and second debris paths D1, D2 of FIG. 5B. This arrangement redirects the flow of debris or otherwise reduces a likelihood that debris with migrate from the airflow compartment AC and/or the seal assembly 66 toward the bearing 62.

Figure 7:
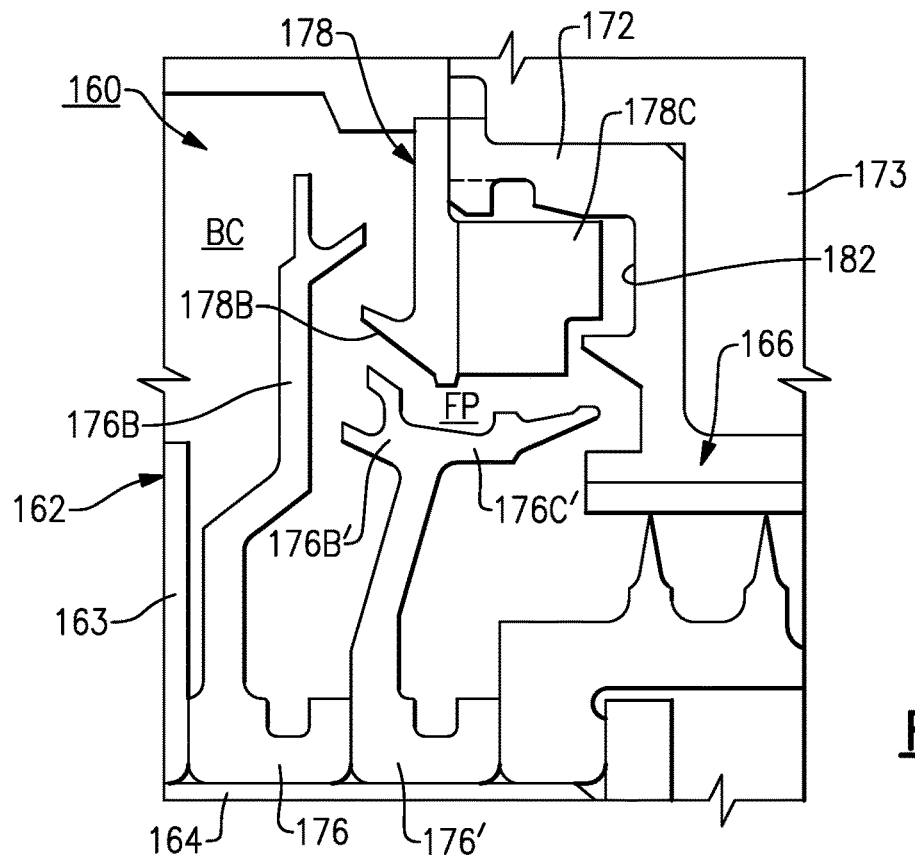
FIG. 7 illustrates a bearing assembly according to a second example.

Referring to FIG. 7, a bearing assembly 160 according to a second example is shown. The bearing assembly 160 includes a first deflector 176 and a second deflector 176' extending about, and is carried by, shaft 164. The first deflector 176 abuts against bearing carrier 163 and extends radially between portions of bearing 162 and coalescer 178. The second deflector 176' extends axially between an inner periphery of the coalescer 178 and portions of seal assembly 166. The pair of sequentially arranged deflectors 176, 176' can improve the effectiveness of shielding the seal assembly 166 and bearing 162 from each other.

Figure 8:
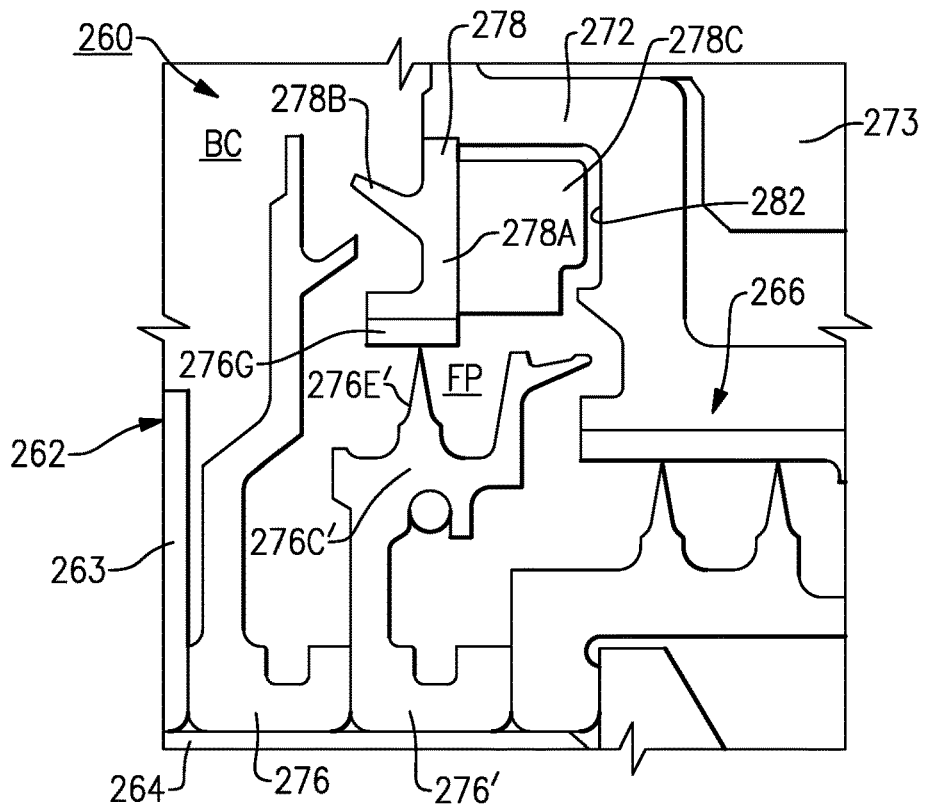
FIG. 8 illustrates a bearing assembly according to a third example.

Referring to FIG. 8, a bearing arrangement 260 according to a third example is shown. The bearing arrangement 260 includes a first deflector 276 and a second deflector 276'. The second deflector 276' can include one or more knife-edge edges 276E' (one shown) extending outwardly from an outer periphery of second flange 276C' that cooperate with a seal land 278G along an inner periphery of coalescer body 278A of coalescer 278 to establish a sealing relationship along fluid passage FP in response to relative rotation. The seal land 278G can be made of an abradable material for contact with knife-edge edge 276E' caused by relative radial movement. The seal relationship can reduce flow of lubricant and debris through the flow path FP.

Figure 9:
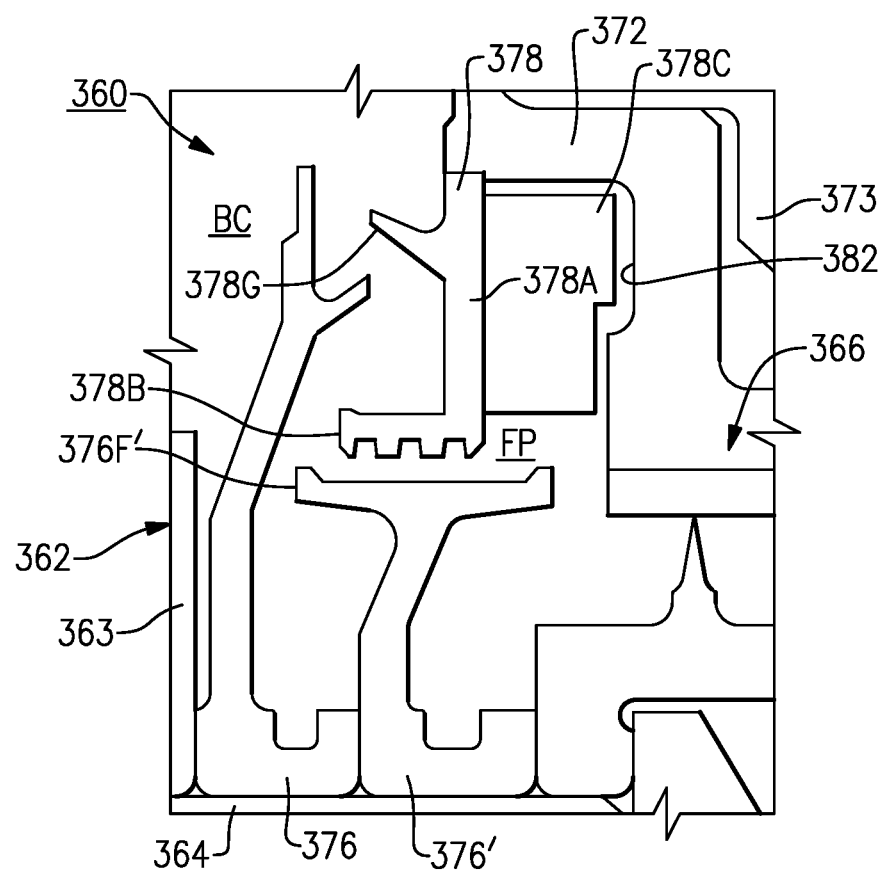
FIG. 9 illustrates a bearing assembly according to a fourth example.

FIG. 9 illustrates a bearing assembly 360 according to a fourth example. The bearing assembly 360 includes a first deflector 376 abutting against bearing carrier 363 and a second deflector 376' situated between the first deflector 376 and the seal assembly 366. The deflector 376' includes an axially extending seal land 376F' that is situated adjacent to a circumferentially extending flange 378B along a radially inner portion of the coalescer body 378A. The flange 378B includes one or more ribs along an inner periphery for establishing a wind back sealing relationship with the seal land 376F' of the deflector 376'.

Figure 10:
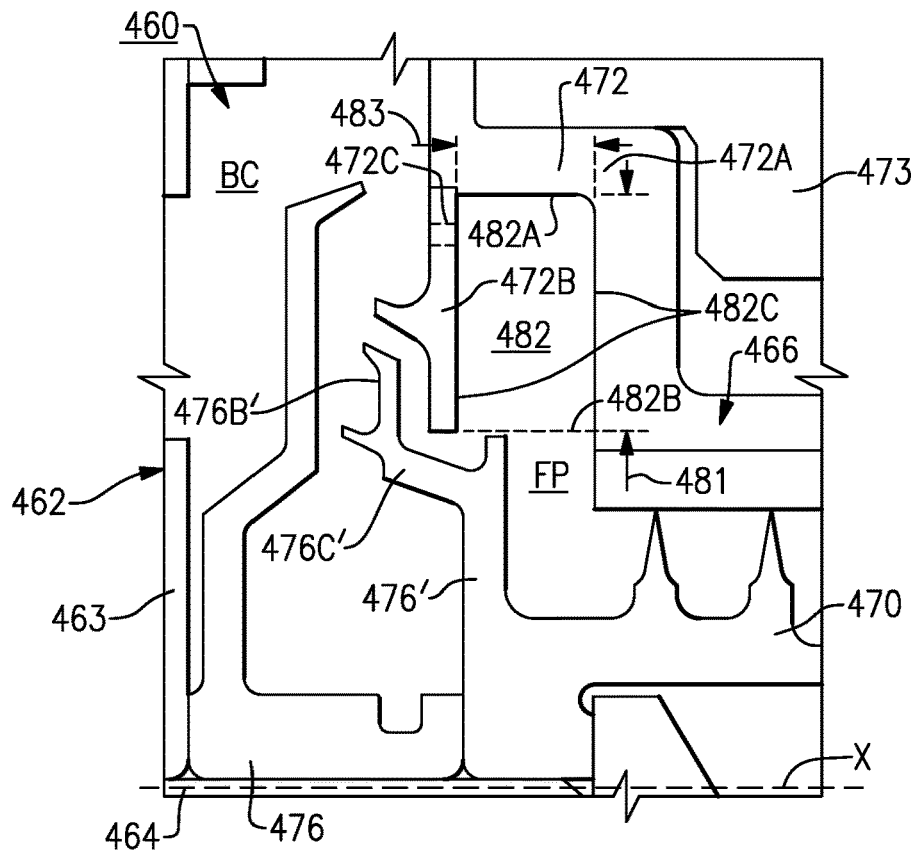
FIG. 10 illustrates a bearing assembly according to a fifth example.

FIG. 10 illustrates a bearing assembly 460 according to a fifth example. The bearing assembly 460 includes a first deflector 476 and a second deflector 476'. The deflector 476' is attached to, or is otherwise integrally formed with, a portion of labyrinth seal 470. The deflector 476' can include an axially extending second flange 476C' and a radially extending first flange 476B' branching from the second flange 476C'.

In the illustrated example, a coalescer is omitted. Seal support 472 includes a main body 472A and a flange 472B that extends radially inward with respect to the longitudinal axis X (FIG. 2). The flange 472B of the seal support 472 and the flanges 476B', 476C' of the deflector 476' establish portions of the fluid passage FP having a generally serpentine profile.

Flange 472B extends radially to bound pocket 482. Pocket 482 can be a relatively deep circumferential trough or annular groove that serves as a mist arrester for causing lubricant to migrate away from a radially flow field of the bearing assembly 460 and can be dimensioned to provide coalescence of lubricant for scavenging. Rather, the pocket 482 can serve as a quieting channel that at least partially isolates lubricant in the fluid passage FP that flows generally outwardly from the adjacent radially flow field of the rotating components. For example, the pocket 482 extends radially between a floor 482A and an opening 482B to define a first distance 581. The opening 482B provides fluid communication between the pocket 482 and the fluid passage FP. In the illustrated examine of FIG. 10, the floor 482A and the opening 482B can each have a generally circumferential geometry swept about longitudinal axis X, with the opening 482B situated radially between the floor 482A and shaft 462. The pocket 482 extends axially from the floor 482A between opposed sidewalls 482C to define a second distance 583. In some examples, a ratio of the first distance 581 to the second distance 583 is at least about 1:2, such as between 1:1 and 3:1. In other examples, the ratio of the first and second distances 481, 483 is less than about 5:1, for example. Flange 472B of the seal support 472 can define a drain passage 472C (shown in dashed lines) that establishes a flow path between the pocket 482 and adjacent portions of the bearing compartment BC for draining lubricant collected in the pocket 482.

Figure 11:
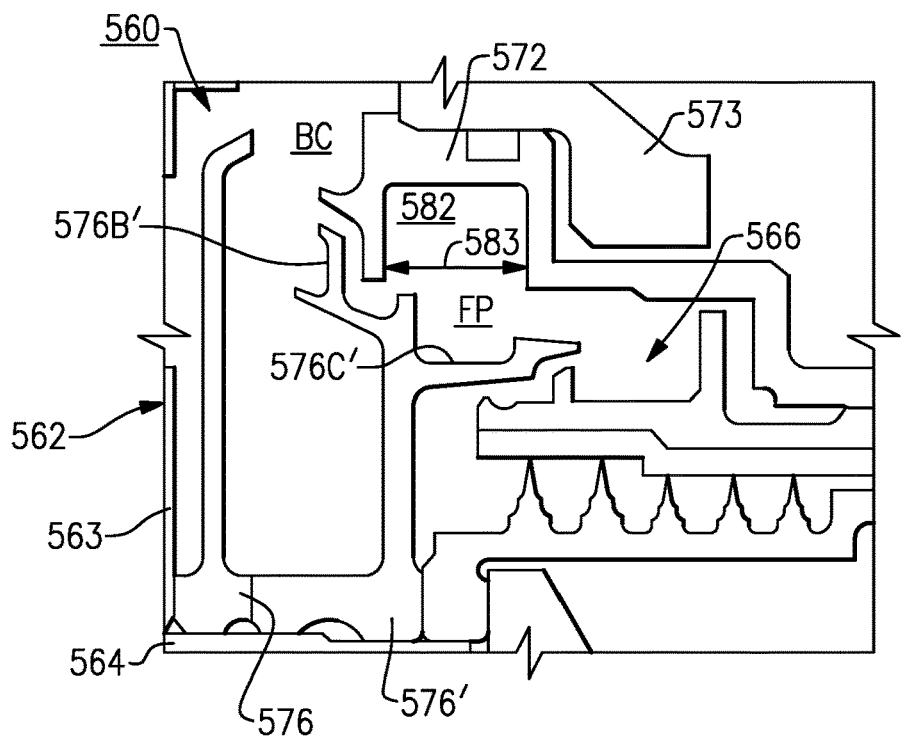
FIG. 11 illustrates a bearing assembly according to a sixth example.

FIG. 11 illustrates a bearing assembly 560 according to a sixth example. The bearing assembly 560 includes a first deflector 576 and a second deflector 576'. In the illustrated example, the second deflector 576' is distinct from seal assembly 566. Flanges 576B' and/or 576C' can extend axially a distance 583 defined by opposed sidewalls of the pocket 582 such that pocket 582 is substantially fluidly separated from the seal assembly 566.

Figure 12:
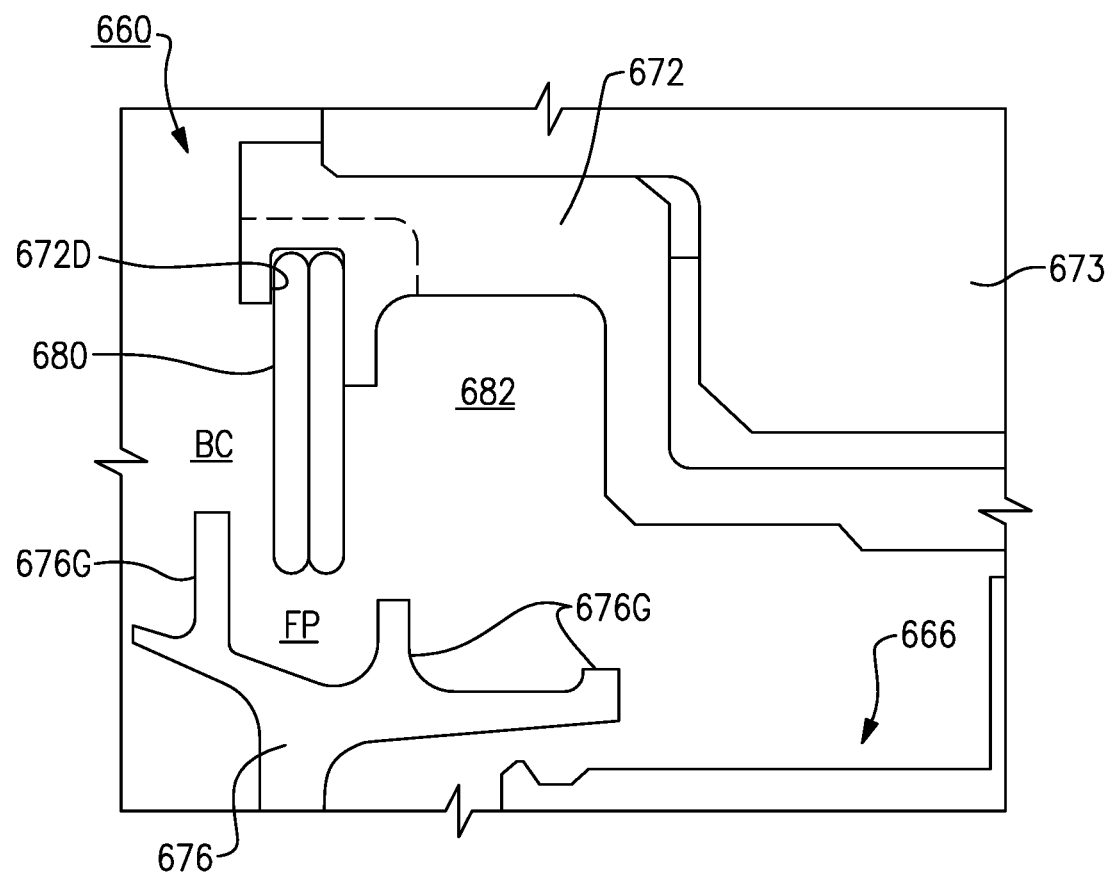
FIG. 12 illustrates a bearing assembly according to a seventh example.

FIG. 12 illustrates a bearing assembly 660 according to a seventh example. Seal support 672 defines a circumferential groove or recess 672D for receiving a hoop-shaped retaining ring 680. The retaining ring 680 extends radially inward relative to the longitudinal axis X (FIG. 2) to bound pocket 682. The retaining ring 680 serves as a mist arrestor which assists in trapping lubricant in the form of mist or vapor, for example, within the pocket 682. The retaining ring 680 can be situated between circumferential ridges 676G of the deflector 676 to establish a serpentine flow path through the fluid passage FP.

Figure 13:
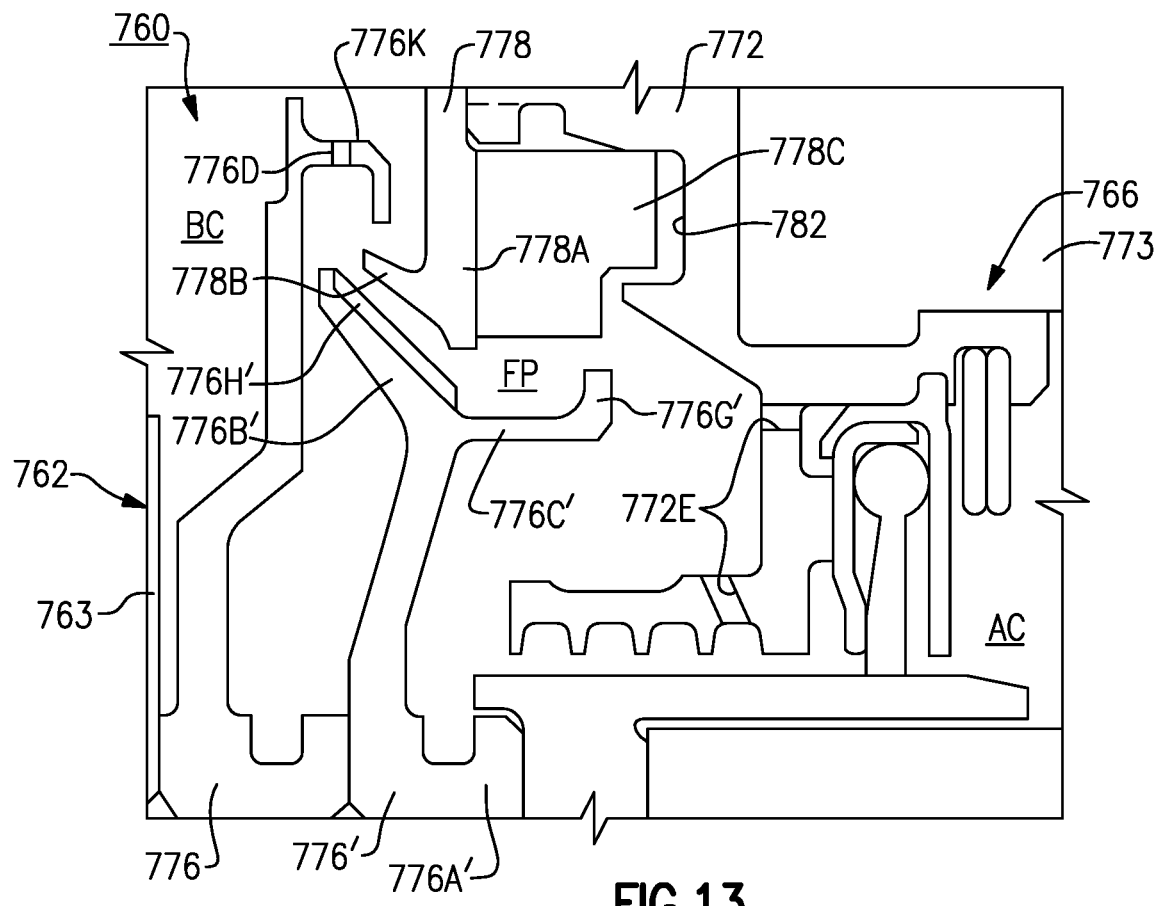
FIG. 13 illustrates a bearing assembly according to an eighth example.

FIG. 13 illustrates a bearing assembly 760 according to an eight example. The bearing assembly 760 includes a first deflector 776 and a second deflector 776'. The second deflector 776' includes first and second flanges 776B', 776C' between bearing 762 and seal assembly 766. The second flange 776C' is situated radially between one or more coalescer paddles 778C of the coalescer 778 and portions of the seal assembly 766. Seal support 772 can define one or more passages 772E for reducing a likelihood of lubricant hiding or otherwise collecting about portions of the seal assembly 766.

Figure 14:
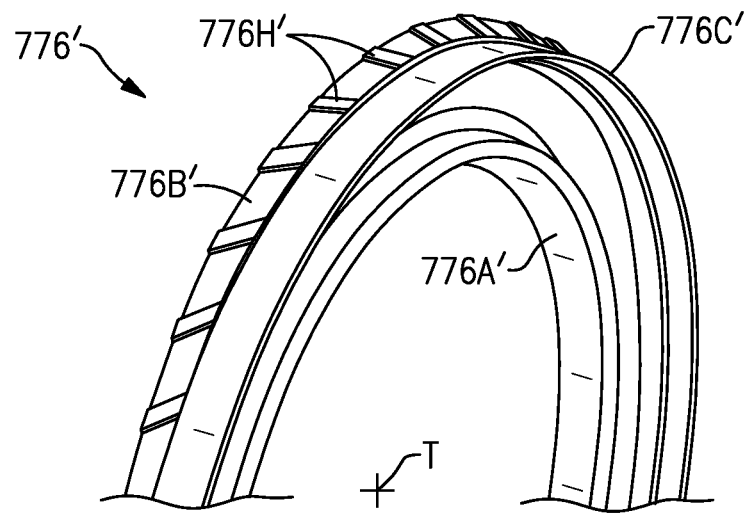
FIG. 14 illustrates a perspective view of a deflector according to an example.

As illustrated by FIG. 14, the deflector 776' includes a ring-shaped deflector body 776A' and an array of deflector paddles 776H extending from the first flange 776B' and that are situated adjacent to circumferential flange 778B of coalescer 778. The paddles 776H' can be circumferentially distributed about an outer periphery of the first flange 776B' relative to deflector axis T. The deflector paddles 776H' can provide a pumping action by creating a pressurized field in response to rotation about the longitudinal axis X (FIG. 2) for moving fluid such as lubricant or airflow in the fluid passage FP away from the seal assembly 766 and back into the bearing compartment BC. Rather, the deflector paddles 776H' interact with circumferential flange 778B to establish a hydrodynamic sealing relationship in response to relative rotation.

FIG. 15 illustrates a bearing assembly 860 according to a ninth example. The bearing assembly 860 includes a first deflector 876 and a second deflector 876'. The second deflector 876' includes one or more deflector paddles 876H' distributed about a circumference or outer periphery of first flange 876B' of the deflector 876' for providing a pumping action. The deflector 876' include one or more circumferential ridges 876G' along the second flange 876C' for opposing flow through the fluid passage FP, as illustrated by FIGS. 16 and 17. The circumferential ridges 876G' can be arranged adjacent to coalescer paddles 878C of coalescer 878 to reduce a rate of flow through the fluid passage FP and for interaction of fluid with the coalescer paddles 878C.

Figure 18:
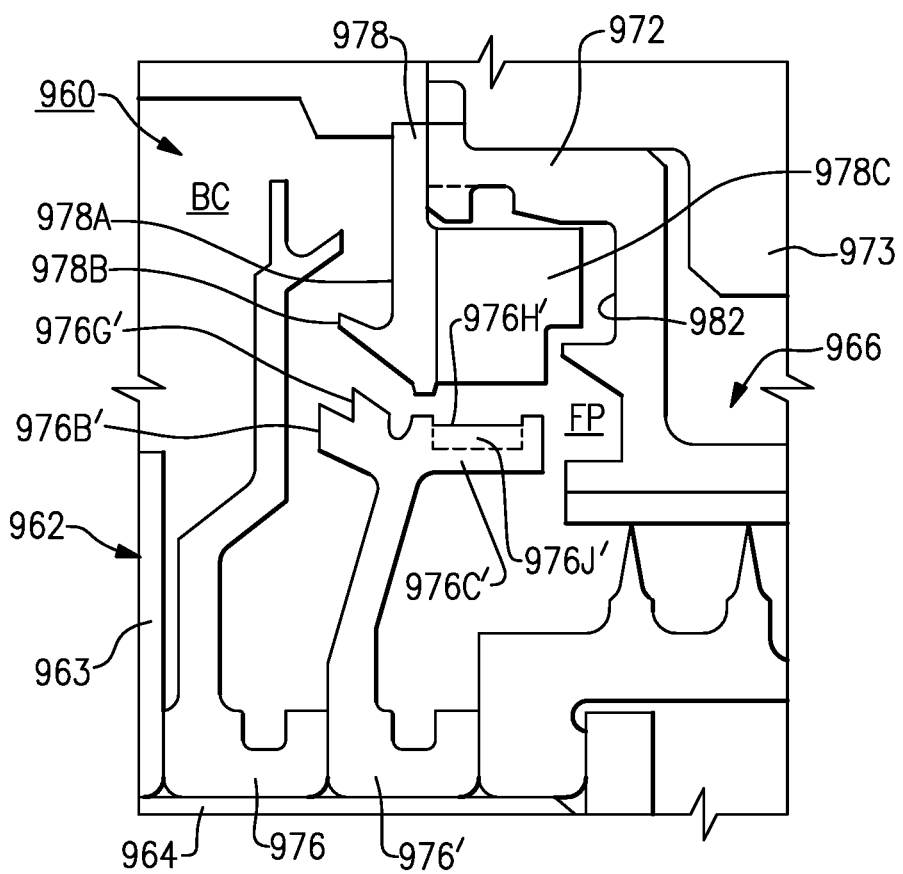
FIG. 18 illustrates a bearing assembly according to a tenth example.
Figure 19:
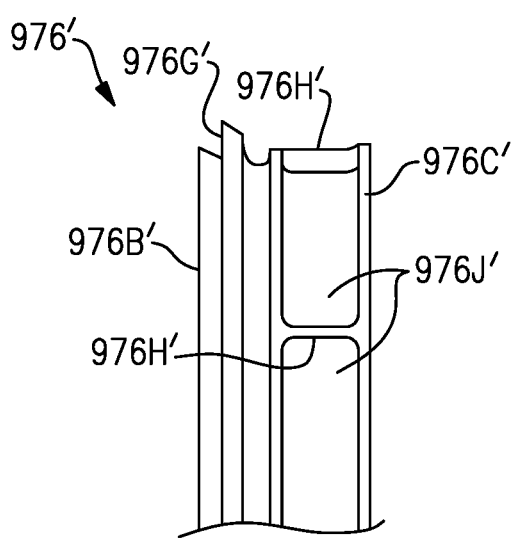
FIG. 19 illustrates a side view of a deflector according to a third example.
Figure 20:
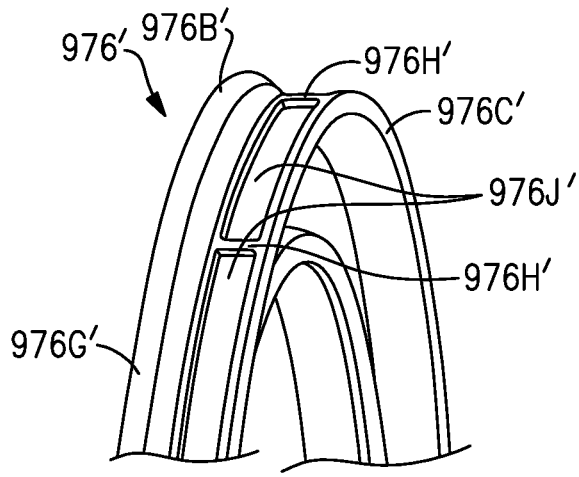
FIG. 20 illustrates a perspective view of the deflector of FIG. 19.

FIG. 18 illustrates a bearing assembly 960 according to a tenth example. The bearing assembly 960 includes a first deflector 976 and a second deflector 976'. The second deflector 976' includes first flange 976B' and a second flange 976C'. The second flange 976C' includes one or more deflector paddles 976H' that define one or more pockets 976J' defined about a circumference of the second flange 976C', as seen in FIGS. 19 and 20. The pockets 976J' can be substantially axially aligned with one or more coalescer paddles 978C of the coalescer 978. The coalescer paddles 978C can extend from an outer periphery of the circumferential flange 1078J. The first flange 876B' can define ridge 976G' in the form of a circumferential rib having an outer periphery sloping towards the one or more pockets 976J'.

The arrangement of the paddles 976H' and pockets 976J' can provide a pumping action to direct airflow and/or lubricant toward surfaces of the coalescer 978 for coalescence and subsequent scavenging. For example, the deflector 976' can be rotatable with shaft 64 (FIG. 2) to cause fluid in fluid passage FP to impinge on coalescer paddles 978C.

Figure 21:
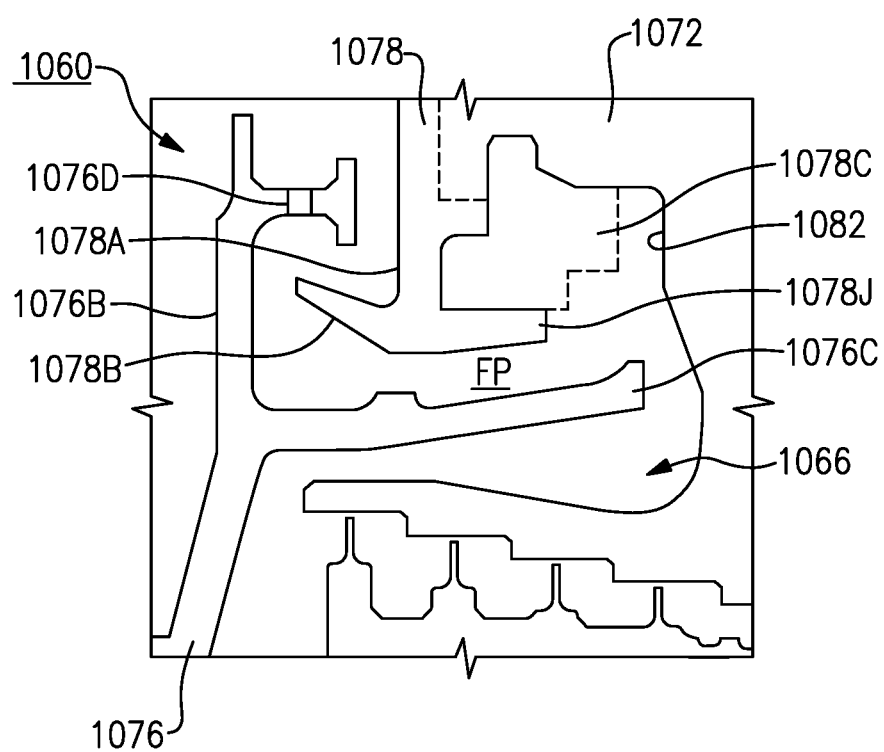
FIG. 21 illustrates a bearing assembly according to an eleventh example.

FIG. 21 illustrates a bearing assembly 1060 according to an eleventh example. Coalescer 1078 includes a first circumferential flange 1078B and a second circumferential flange 1078J each extending from opposed radial faces or sidewalls of coalescer body 1078A. In some examples, the coalescer 1078 can include one or more coalescer paddles 1078C (one shown in dashed lines). The coalescer paddles 1078C can be distributed about an outer periphery of the second circumferential flange 1078J. In alternative examples, the coalescer 1078 is incorporated into seal support 1072.

Figure 22:
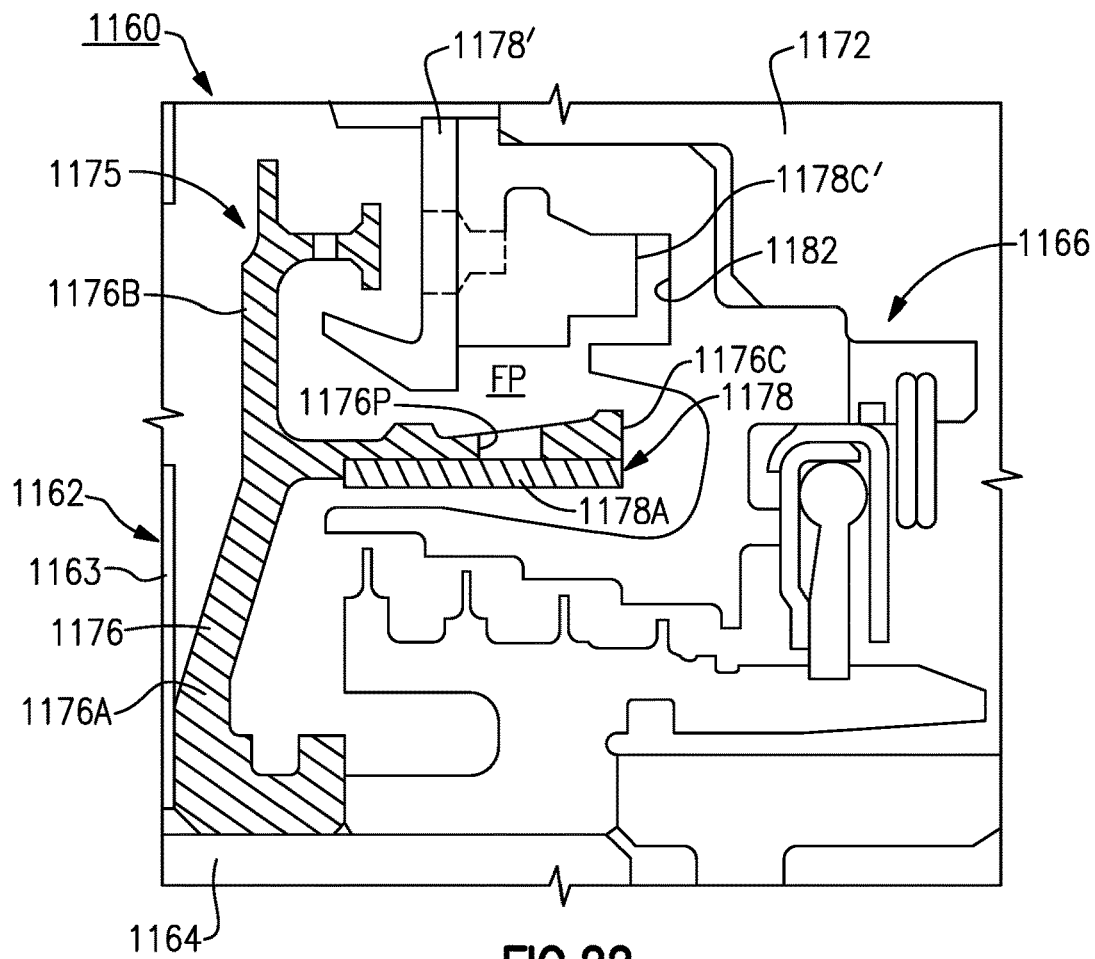
FIG. 22 illustrates a bearing assembly according to a twelfth example.
Figure 23:
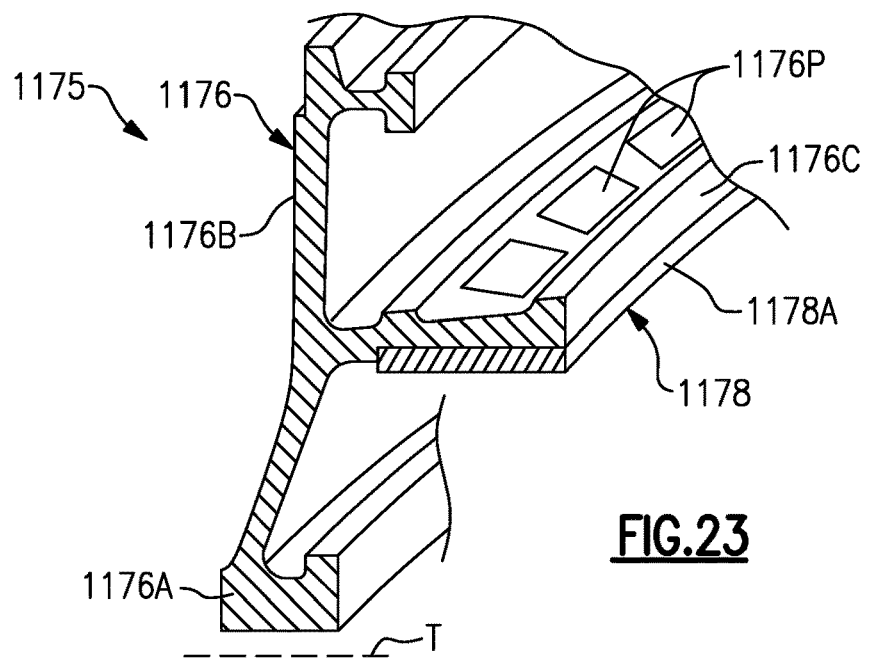
FIG. 23 illustrates a perspective view of the deflector of FIG. 22.

FIG. 22 illustrates a bearing assembly 1160 according to a twelfth example. The bearing assembly 1160 includes a deflector-coalescer assembly 1175 having a deflector 1176 combined or integrated with a coalescer 1178. The coalescer 1178 includes a coalescer body 1178A that can have a generally annular or ring-shaped geometry. An inner diameter of flange 1176C of deflector 1176 carries the coalescer 1178 for filtering lubricant particles in fluid passage FP, as seen in FIG. 23. In other examples, the coalescer 1178 is mechanically attached to another portion of the deflector 1176, such an outer diameter of the flange 1176C. The coalescer 1178 can be made of a sintered metal or a porous membrane such as a metallic sponge, for example, that is press fitted into the flange 1176C. Other techniques for securing the coalescer 1178 to the deflector 1176 can be utilized, such as forming a sintered metal or porous membrane on surfaces of deflector 1176 along the flange 1176C.

The flange 1176C defines one or more deflector pockets 1176P circumferentially distributed about deflector axis T and extending from, or otherwise adjacent to, the coalescer 1178 for allowing fluid such as lubricant that has been processed by the coalescer 1178 to pass therethrough for scavenging. The deflector-coalscer assembly 1175 can simplify assembly of the bearing assembly 1160 and installation of the engine 20, for example. The bearing assembly 1160 can also include coalescer 1178' to process lubricant in the fluid passage FP. In other examples, coalescer 1178' is omitted.

Although a number of embodiments have been described above, other implementations, modifications and variants are possible in light of forgoing teachings. For example, although the bearing assembly, the seal assembly and bearing compartment are primarily discussed with respect to a lubricant flow or airflow, the concepts and teachings herein may be implemented or otherwise used for non-oil applications as well.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A bearing assembly comprising:
   a bearing situated in a bearing compartment;
   a seal assembly defining the bearing compartment;
   at least one deflector between the bearing and the seal assembly that is rotatable about an axis; and
   a coalescer at least partially extending about the at least one deflector to define a fluid passage, wherein the coalescer includes a ring-shaped coalescer body that circumferentially extends about the deflector and is attached to a static structure, the at least one deflector includes a ring-shaped deflector body that radially opposes the coalescer body to define a radial gap along the fluid passage, and the deflector body is rotatable about the axis.

2. The bearing assembly as recited in claim 1, wherein the at least one deflector is rotatable with a shaft to cause fluid in the fluid passage to impinge on the coalescer.

3. The bearing assembly as recited in claim 2, wherein one or more paddles extending from the deflector body.

4. The bearing assembly as recited in claim 2, wherein a circumferential rib and one or more pockets each defined about a circumference of the deflector body, and an outer periphery of the circumferential rib sloping towards the one or more pockets.

5. The bearing assembly as recited in claim 1, wherein the coalescer includes one or more paddles extending from the coalescer body.

6. The bearing assembly as recited in claim 5, wherein the coalescer includes a first circumferential flange and a second circumferential flange extending from opposed sidewalls of the coalescer body, the one or more paddles distributed about an outer periphery of the second circumferential flange.

7. The bearing assembly as recited in claim 5, the one or more paddles include a plurality of paddles that extend in an axial direction away from the coalescer body relative to the axis, and adjacent pairs of the paddles define a plurality of circumferentially extending pockets that extend radially outward from the radial gap relative to the axis.

8. The bearing assembly as recited in claim 7, wherein one or more passages extend axially through a thickness of the coalescer body with respect to the axis, and the one or more passages interconnect the bearing compartment and a respective pocket of the plurality of pockets.

9. The bearing assembly as recited in claim 1, wherein the at least one deflector and the coalescer are arranged such that the fluid passage is a serpentine fluid passage connected to the seal assembly.

10. The bearing assembly as recited in claim 9, wherein the at least one deflector includes a first deflector and a second deflector, the first deflector extending between the bearing and the coalescer, and the second deflector extending between an inner periphery of the coalescer and portions of the seal arrangement.

11. The bearing assembly as recited in claim 10, wherein the second deflector is configured to establish a sealing relationship with the inner periphery of the coalescer in response to relative rotation.

12. The bearing assembly as recited in claim 1, wherein:
the seal assembly includes a labyrinth seal and a brush seal that oppose flow of lubricant from the bearing compartment.

13. The bearing assembly as recited in claim 12, wherein:
the coalescer includes one or more coalescer paddles extending from a first radially face of the coalescer body, and a circumferential flange extending from a second, opposed radially face of the coalescer body.

14. The bearing assembly as recited in claim 13, wherein:
the deflector body extends about a circumference of a shaft, and at least one deflector includes a first flange and a second flange each branching from the deflector body, the first flange extending radially between the bearing and the coalescer with respect to the axis.

15. The bearing assembly as recited in claim 1, wherein:
the at least one deflector abuts against a carrier of the bearing.

16. The bearing assembly as recited in claim 15, wherein:
the coalescer body includes an arcuate top portion extending at least 180 degrees about a coalescer axis, the top portion being free of any coalescer paddles.

17. The bearing assembly as recited in claim 16, wherein:
the second flange of the at least one deflector is coaxial with portions of the labyrinth seal and an inner periphery of the coalescer body to define an intermediate section of fluid passage, the fluid passage including a first section extending through the labyrinth seal, a second section extending between the first flange of the at least one deflector and the circumferential flange of the coalescer, and an intermediate section connecting the first and second sections such that the fluid passage is a serpentine fluid passage.

18. A gas turbine engine comprising:
a fan section including a plurality of fan blades;
a compressor section in fluid communication with the fan section;
a turbine section driving the fan section or the compressor section through a rotatable shaft, the shaft rotatable about an engine longitudinal axis; and
a bearing assembly supporting the shaft, comprising:
a bearing situated in a bearing compartment;
a seal assembly extending from a seal support, the seal support defining a trough extending from a floor, with an opening of the trough situated between the floor and the shaft;
a deflector rotatable with the shaft and extending toward the trough; and
a coalescer at least partially extending about the deflector to define a fluid passage, and wherein the coalescer includes a ring-shaped coalescer body that circumferentially extends about the deflector and is attached to a static structure; and
wherein the deflector includes a ring-shaped deflector body that radially opposes the coalescer body to define a radial gap along the fluid passage, and the deflector body is rotatable about the engine longitudinal axis.

19. The gas turbine engine as recited in claim 18, wherein the trough is bounded by the coalescer.

20. The gas turbine engine as recited in claim 18, wherein the coalescer includes one or more coalescer paddles circumferentially distributed about the ring-shaped coalescer body, each of the one or more paddles extending into the trough, and wherein the deflector includes one or more circumferentially distributed deflector paddles.

21. The gas turbine engine as recited in claim 18, wherein the seal assembly includes a labyrinth seal and a brush seal that establish a sealing relationship at a location radially inward of the trough.

* * * * *